United States Patent [19]

Aiello

[11] Patent Number: 4,884,016
[45] Date of Patent: Nov. 28, 1989

[54] CLOSED LOOP TORQUE ANGLE CONTROL OF SYNCHRONOUS MOTOR

[75] Inventor: Michael E. Aiello, Monroeville, Pa.
[73] Assignee: Aerotech, Inc., Pittsburgh, Pa.
[21] Appl. No.: 235,983
[22] Filed: Aug. 23, 1988
[51] Int. Cl.$^4$ .............................................. G05B 19/40
[52] U.S. Cl. .................................... 318/685; 318/696; 318/661; 318/563
[58] Field of Search ................ 318/685, 696, 661, 563

[56] References Cited

U.S. PATENT DOCUMENTS

| | | | |
|---|---|---|---|
| 3,585,376 | 10/1968 | Toscano | 318/563 |
| 4,051,419 | 9/1977 | Takahashi | 318/227 |
| 4,297,625 | 10/1981 | Newell | 318/696 |
| 4,426,608 | 1/1984 | Larson et al. | 318/685 |
| 4,447,771 | 5/1984 | Whited | 318/661 |
| 4,490,661 | 12/1984 | Brown et al. | 318/661 |
| 4,518,907 | 5/1985 | Giguere | 318/696 |
| 4,540,925 | 9/1985 | Jones | 318/602 |
| 4,652,806 | 3/1987 | Aiello | 318/696 |
| 4,761,598 | 8/1988 | Lovrenich | 318/685 |

OTHER PUBLICATIONS

"Trends Absolute Position Encoder", IBM Technical Disclosure Bulletin, vol. 30, No. 3, Aug. 1987, referred to as -IBM-and used in the plural.

Primary Examiner—William M. Shoop, Jr.
Assistant Examiner—Saul M. Bergmann
Attorney, Agent, or Firm—Webb, Burden, Ziesenheim & Webb

[57] ABSTRACT

A closed loop motor system having a motor with a plurality of poles and motor windings associated therewith. The poles define full step motor output positions. The system is of the type that assigns intermediated current values to the motor windings for fine step positions of the motor. The system also comprises a motor output position encoder for generating an integral and fixed number of encoder pulses as the motor moves between any two motor poles. The pulses are equally spaced and at least some corresponding to the fine step positions. An initializing current comprising components for applying full step current values to motor windings for a time interval in which the motor output is assumed to align with a full step position, and components for zeroing the count in the counter and assigning the torque angle value, whereby the encoder does not require alignment relative to the motor.

9 Claims, 5 Drawing Sheets

CLOSED LOOP TORQUE ANGLE CONTROL OF SYNCHRONOUS MOTOR

BACKGROUND OF THE INVENTION

Electronic torque angle control for commutation of field flux in stationary armature motors has been a known motor control technique for many years. The development of this technique was spurred by the desire to utilize an AC synchronous machine in a "closed loop" position-control environment, traditionally reserved for "brush" type DC servo motors. Permanent magnets replaced the field windings in the rotor of the AC synchronous motor which, traditionally, were energized through slip rings and brushes. The utilization of permanent magnets in the rotor provided for brush free operation.

The brushless machines were referred to as "brushless DC" motors due to the expense involved in electronically emulating pure sinusoidal current required by the traditional "line" driven AC synchronous motors.

The stator poles in these motors were purposely skewed to produce a "flattened" counter electro-motive force (CEMF) in each of the phase windings. In turn, the phase currents (controlled by the amplifier) were in themselves "flat" In this control method formally known as "six step" control, the currents in each phase (assuming three phase) are alternating "square" waves which are positive for 120 degrees, off for 60 degrees, negative for 120 degrees, and off again for 60 degrees. The stator current to flux transpositions are noticeably finite in that only six flux angles per electrical cycle are possible with this type of control. The direction of stator flux generated by a given stator pole is always perpendicular to the given pole (90 degrees displaced). The magnitude of this flux is generally proportional to the magnitude of current flowing in the specific pole windings.

The standard method for "six step" commutation feedback is to place three Hall effect switches in the stator windings of the motor. Three logic signals are produced from these switches.

Six step commutation control is a relatively inexpensive and a simple technique to implement, as far as commutation drive logic drive amplifier and rotor sensor feedback are concerned. However, performance suffers in that the torque angle "jumps" ahead of the rotor magnet flux in 60 degree increments due to the relatively crude resolution of the rotor feedback sensors (six steps per full electrical cycle). Low speed performance suffers because motor poles can never be perfectly positioned (skewed) in manufacturing to provide "flattened" CEMF waveforms over the "flat" six step induced phase currents.

As a result, torque fluctuations (at a fundamental rate of six times per electrical cycle) are induced on the rotor shaft, complicating smooth low speed control when the motor is used in a closed loop position or velocity application.

The drive amplifier portion of the six step controller is usually implemented with SCRs (thyristors). These semiconductor switches are used to "route" a constant current source (or voltage source, if voltage instead of current is being regulated) through the six steps of the electrical cycle. A DC current regulator (for six step current control) or DC voltage regulator (for six step voltage control) is inserted in "front" of the SCR bridge to control the amplitude of the phase current or phase voltage, respectively.

With the emergence of high power switching bipolar transistors came the ability to provide pulse width modulation (PWM) current control to the stator phase windings of the brushless motor.

Since, the bipolar transistor has the ability to "switch" at a much higher rate than the SCR, phase current (or voltage) amplitude along with the "six step" phase routing can be incorporated into one set of devices, if desired.

However, with PWM capability, the waveforms no longer need to resemble square waves as in the six step control discussed above. With the proper drive amplifier control electronics, PWM control can be used to generate sinusoidal waveforms for each phase of the motor. See, for example, Jones U.S. Pat. No. 4,540,925 and Takahashi U.S. Pat. No. 4,051,419.

Using sinusoidal control, the motor stator can now be wound with the simpler, more traditional method for true AC control. The low speed torque fluctuation problems apparent with six step control are significantly reduced.

However, the rotor feedback sensor(s) needed to generate the sinusoidal (as opposed to the six step) current (or voltage) waveforms need to be more complex. This is because the sinusoidal waveform "varies" amplitude with rotor position, while the six step wave form turns "off or on" with plus or minus polarity to a constant amplitude, depending on the position of the rotor within a ±30 degree envelope. A small, incremental angular change in rotor position must be able to be detected in order to emulate the sinusoidal stator phase currents.

The complicated rotor sensor needed to generate the sinusoidal phase control waveforms needs to have much more position resolution than the simple six step rotor sensors described for the DC brushless controller. The drive amplifier control electronics must be more complicated in order to generate the sinusoidal current command signals. These two factors tend to illustrate the negative aspects of the AC brushless control scheme.

High performance AC brushless drive manufacturers have generally established the "resolver" position transducer as the "standard" for deriving absolute rotor position necessary for sinusoidal control. The resolver is a magnetic sensor resembling a small two phase AC motor whose rotor is excited with a high frequency AC square wave induced on its rotor winding (usually through a set of small slip rings). Two stator windings (electrically displaced 90 degrees) "couple" the rotor field. As the shaft of the resolver is turned, the two stator phases alternate sinusoidally and in quadrature (i.e., one sine, the other cosine).

The two returning stator phases (along with the outgoing excitation signal) are connected to a sophisticated demodulator chip (usually termed "Resolver to Digital" converter). This converter produces "digital" output information relative to the "absolute" rotor position of the resolver (and hence the rotor position of the AC motor relative to its stator). The digital output of the converter chip (usually 10 to 16 bits in resolution), in turn, is fed to the address inputs of a ROM (read-only-memory) chip. The ROM (or ROMs) chip is programmed with multiple sets of "sinusoidal" data, relative to the ROM address inputs. The sinusoidal output of the ROM is in turn converted into analog signals through a Digital to Analog converter (D/A). It is these signals that are used as current command signal to the power amplifier. The motor stator phase currents controlled by these signals are referenced to the motor through the ROM data tables to produce a stator field flux that is angularly displaced with respect to the rotor field by some predetermined angle.

This angular phase displacement is usually fixed. (More sophisticated controllers allow the angle to vary under controlled conditions). Fixed angular phase displacement (angular phase displacement will be denoted as "Torque Angle" from this point) is the usual form of control for brushless machines used in positioning applications. With fixed torque angle control, the only control variable for motor operation is the varying of amplitude of the sinusoidal current flowing in each of the motor stator windings. Thus an AC drive amplifier, matched with AC brushless motor whose rotor feedback mechanism provides "fixed" torque angle rotor to stator displacement is essentially an electronically controlled version of the traditional DC drive and DC brush type motor with "fixed" mechanical brush commutator.

The general purpose "hybrid" stepping motor is in essence an AC brushless motor whose stator is wound for two phase instead of three phase excitation, and whose mechanical pole count is typically much higher than that of the general purpose three phase AC brushless motor.

Figure 1:
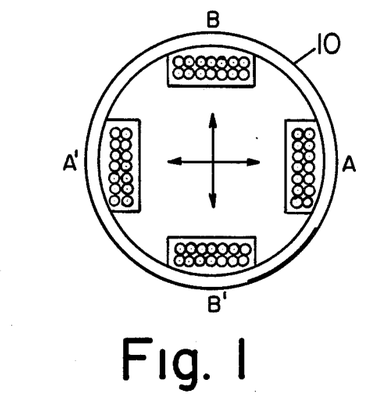
FIG. 1 is a schematic cross section of a simplified stepping motor showing the position of stator windings A-A' and B-B'.

FIG. 1 illustrates the basic stator winding phase relationships of a stepping motor (rotor not shown). The stator 10 consists of two winding set labeled A-A' and B-B' "electrically" displaced by 90 degrees. The word "electrically" is emphasized to illustrate the fact that this general type of stepping motor actually consists of multiple sets of A-A' and B-B' (usually 50 sets) distributed evenly around the stator shell. For simplicity, this and future illustrations will depict the stepping motor as having one set of A-A' and B-B' poles. Thus, for these illustrations one full electrical cycle will represent one full rotor (mechanical) cycle. The flux produced by a given winding (say B-B') is always perpendicular to the given winding in the direction determined by the direction of current flow in the winding, as shown in FIG. 1. This characteristic of course, is the same for that described for the DC and AC brushless motors.

Figure 2:
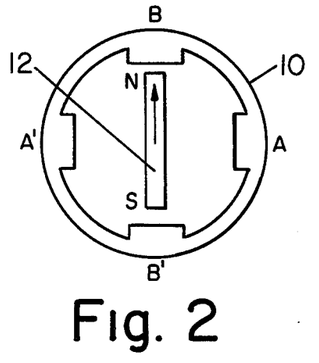
FIG. 2 a schematic similar to FIG. 1 illustrating the permanent magnet rotor aligned with the stator windings B-B'.
Figure 3:
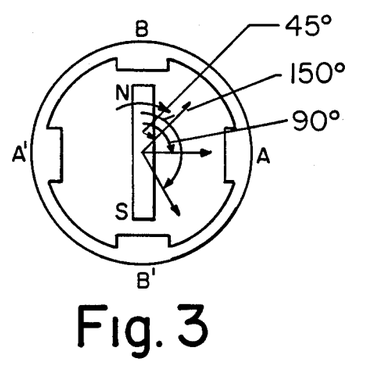
FIG. 3 is a schematic similar to FIG. 1 illustrating various torque angles that can be induced by stator flux (for example, the 45 degree angle results from the flux of the A–A' phase and the B–B' phase equal to 0.707 of maximum)

If a permanent magnet rotor 12 is inserted in the center of the two sets of stator windings of FIG. 2, and the two windings are energized with stator flux of the A-A' phase equal to 1 P.U. current and stator flux of the B-B' phase equal to zero P.U. current the rotor will line up with the resultant stator field. The motor will exhibit a "Zero Torque" angle between the permanent magnet rotor flux and electrically excited field flux of the stator. If the stator field flux is "rotated" by a given angle away from the rotor as shown in FIG. 3, a mechanical force will be generated in the direction towards the stator flux position. The amount of force imposed on the rotor by the stator flux field is proportional to the component of the stator flux perpendicular to the rotor. In other words, a stator flux torque angle, introduced 90 degrees perpendicular to the rotor, produces maximum torque.

Arbitrary torque angles of 45, 90 and 150 degrees are shown in FIG. 3. The torque produced by these angles is proportional to the perpendicular component (Cosine component) of these angles.

The stator flux can be made to revolve around the two pole sets A-A' and B-B' a full 360 degrees by sinusoidally varying the current in Phase A and B at a constant 90 degree separation with respect to each other (i.e., phase A is sine, phase B is cosine). This is not unlike the revolving stator flux of the AC brushless machine. In this example, three winding sets (A,B, and C) are used instead of two. A micro stepping translator controller for supplying current to a stepping motor is described in my U.S. Pat. No. 4,652,806.

When a stepping motor controlled by a micro stepping translator (as shown in my U.S. Pat. No. 4,652,806) is run in the "open loop" mode, the permanent magnet rotor "follows" the revolving stator flux generated by the phase A and B sinusoidal currents. The torque angle (the angle between the rotor flux and the stator flux) is self determining. In other words, the angle generated is a function of the load on the rotor shaft. As the load increases, the angle becomes greater.

In the open loop mode, the torque angle can never exceed 90 degrees if the maximum load on the rotor is constant starting from zero velocity. This fact should be noted in that this limitation is the main cause of motor stall when the motor is run in the open loop mode. Closed loop control of stepper motors is disclosed in Lander et al. U.S. Pat. No. 3,863,118.

As already noted, there is a method for electronically determining the rotor position of a three phase AC brushless motor using a resolver. A similar method can be applied to the stepping motor in determining the relationship between stator phase current and rotor position. The only difference is that two phase sinusoidal currents are emulated instead of three phase currents.

From previous discussions, it is noted that the torque produced on the rotor shaft is a function of the perpendicular component of the flux produced by the stator (assuming the rotor permanent magnet flux is constant). Thus, for a given level of stator flux (produced by a given level of stator current in Phases A-A' and B-B'), generated torque is equal to the COS $(90-\alpha)$ where $\alpha$ is the torque angle.

The stepping motor was originally developed for "open loop" motion control. In turn, traditional stepping motor drives were capable of only "full" and "half" step current control (i.e., phase windings could only be turned on and off at a predetermined current, a concept not too different from the "six step" control discussed earlier). Thus, the number of poles were required to be high (typically 50) so that relatively small incremental angular steps could be achieved. Micro stepping drive technology soon emerged providing the capability of incrementally varying the phase currents in a sinusoidal fashion. However, the basic characteristic of the stepping motor has not changed. Thus, if a 90 degree torque angle was chosen and a torque versus speed measurement was made on the motor for a fixed stator current, the resultant plot would look no different than a plot of the motor taken under traditional open loop control run with the same stator current.

Remembering the basic motor premise that back EMF voltage is a function of motor shaft RPM, it can be seen that the larger the torque angle, the lower the required stator winding terminal voltage (Vb−b') to generate a given back EMF voltage. Thus, increasing the torque angle above 90 degrees allows for higher speed operation. It should be remembered, however, that a price is paid in that torque produced for a given value of stator current drops with increasing torque angles above 90 degrees. Also, it should be noted that the motor inductance drops as the torque angle is increased. As a result, ripple and eddy current losses become a factor in operating efficiency.

To initialize the torque angle relative to the position of the rotor, the position of the rotor with respect to the stator windings must first be determined. The previous discussion involving the use of a resolver for determining the "absolute" position of the rotor on an AC brushless motor could be similarly applied to the stepping motor. However, the component cost of a resolver based feedback control relative to the basic cost of a hybrid stepping motor is a bit unbalanced. The cost of a 300 oz-in stepping motor is typically $100.00. The component cost of a resolver and associated "resolver to digital" converter chip is typically $160.00. Clearly, the cost of a feedback mechanism that exceeds the drive mechanism by more than 50 percent is undesirable, especially when the labor cost required to mount and align the resolver has not even been included.

The cost of providing feedback information to control the position of the torque angle can be greatly reduced by using a standard incremental encoder (optical-type encoders are the most common). The unit cost of an incremental optical encoder has been found to be as low as $25.00. Costs in converting the signals from an incremental encoder to position data are also low in cost, typically $10.00 to equal the digital output format produced by the "resolver to digital" converter.

The incremental encoder utilizes two signals displaced in quadrature (i.e., one sine, the other cosine) to translate position change. Position is determined by noting the sequence in which the "sine" signal changes level with respect to the "cosine" (or vice versa), while at the same time accumulating the number of level changes with a counter. Another positive aspect of the incremental encoder besides its low price, is its relative accuracy. A typical optical encoder has a rotational position accuracy of ±3 arc-minutes. The typical rotational position accuracy of a resolver is ±6 arc-minutes. However, the aspect of relative ruggedness must not be ignored. The resolver can typically withstand higher mechanical vibrations and higher operation temperatures than an optical encoder.

Since the incremental encoder can only transmit position in unit "steps" and thus, can only reflect "changes" in position, there is no way of determining its initial position relative to motor stator windings when the encoder is powered up.

Remembering that torque angle control requires an "absolute" knowledge of the rotor position relative to induced stator flux, an alternate method is needed for initializing the torque angle using an incremental encoder.

SUMMARY OF THE INVENTION

Briefly, according to this invention, there is provided a closed loop motor control system for a motor with a plurality of poles and associated motor windings wherein the poles define full step motor output positions. The control system is of the type that assigns intermediated current values to the motor windings for commanding fine step positions of the motor output between motor poles. The control system comprises a motor output position encoder for generating an integral and fixed number of encoder pulses as the motor moves between any two motor poles. The pulses are equally spaced and at least some pulses correspond to fine step positions. A circuit which assigns intermediate current values comprises a counter for counting the encoder pulses, a function generator, for example a ROM for converting the count to digital sine and cosine values, analog-to-digital converter for converting the digital sine and cosine values to analog sine and cosine values, and a power amplifier for controlling electrical current to the motor windings associated with the poles in response to the analog sine and cosine values. A circuit is provided for setting the torque angle comprising means for adding or subtracting a torque angle value from the count applied to the function generator. An initializing circuit comprises circuit components for applying full step current values to motor windings for a time interval in which the motor output (rotor) is assumed to align with a full step position, components for zeroing the count in the counter and assigning the torque angle value. It is therefore unnecessary to align the encoder relative to the motor.

Preferably, the output position encoder is a rotary encoder attached to a rotating output shaft of the motor. The encoder may be a linear encoder attached to a follower riding a screw mechanism attached to a rotating output shaft of the motor. The encoder may thus be a line encoder attached to a linear motor.

Preferably, the counter and circuit components for setting the torque angle comprise a presettable up/down counter having a parallel output bus and a parallel input bus for presetting the count. In one embodiment the presettable counter is a programed logic array (PAL device).

Preferably, the function generator and initializing circuit comprise a ROM having address inputs attached to the parallel output of the presettable up/down counter and address means connected to the parallel input bus of the up/down counter such that when the counter is being set to zero the ROM output corresponds to that required to bring the motor output to a full step position.

In one specific embodiment of this invention, the circuit for assigning intermediate motor current positions comprises a source of a multiplexing pulse applied to the function generator and switches at the output of the analog-to-digital converter to provide multiplexed sine and cosine values. Preferably, the analog-to-digital converter comprises a multiplying analog-to-digital converter whenever the multiplying input may be an analog signal level corresponding to the motor current level command.

The motor control system may comprise a microprocessor having an input port for receiving the output of a counter clocked by the encoder pulses, an output port for a parallel bus upon which the value of the torque angle can be placed, and an output port connected to a buffer attached to an analog-to-digital converter for defining an analog current command.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 4:
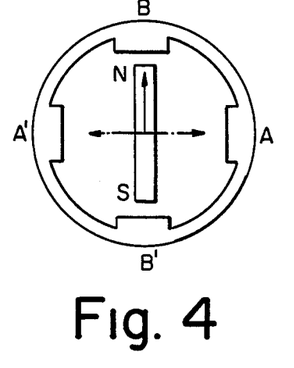
FIG. 4 is a schematic similar to FIG. 1 illustrating the initialization mode and the run mode with the stator flux vector 90 degrees ahead of the rotor.

Consider the simplified stepping motor diagram of FIG. 4. If a stator flux field is generated by inducing a 1 per unit (PU) current in stator winding A–A' (winding B—B' has zero current) a resulting stator flux vector would be generated as shown in FIG. 4. The permanent magnet rotor would "align" itself with the stator flux vector. This, or course, assumes that the rotor shaft is unimpeded or is able to drive a connected load to the position of the stator flux.

If the motor is a standard 50 pole stepping motor (which is the assumption to be made hereafter unless otherwise stated), the rotor would move a maximum of 1.8 degrees to align itself with the stator flux. Since the position of the stator flux vector is "known" by the controller (which is inducing the current in the stator winding B–B' to generate said stator flux vector), then the same controller, knowing the step resolution of the attached encoder, can determine the prescribed torque angle.

FIG. 4 also shows the torque angle "locked" at 90 degrees. Note that the initialization mode illustrated in FIG. 4 uses no marker reference. Initialization is done strictly on the assumption that the rotor aligns itself to an induced stator flux vector. This alignment is almost guaranteed when considering the relatively large amount of torque generated by the stepping motor per unit of induced stator current.

Figure 5:
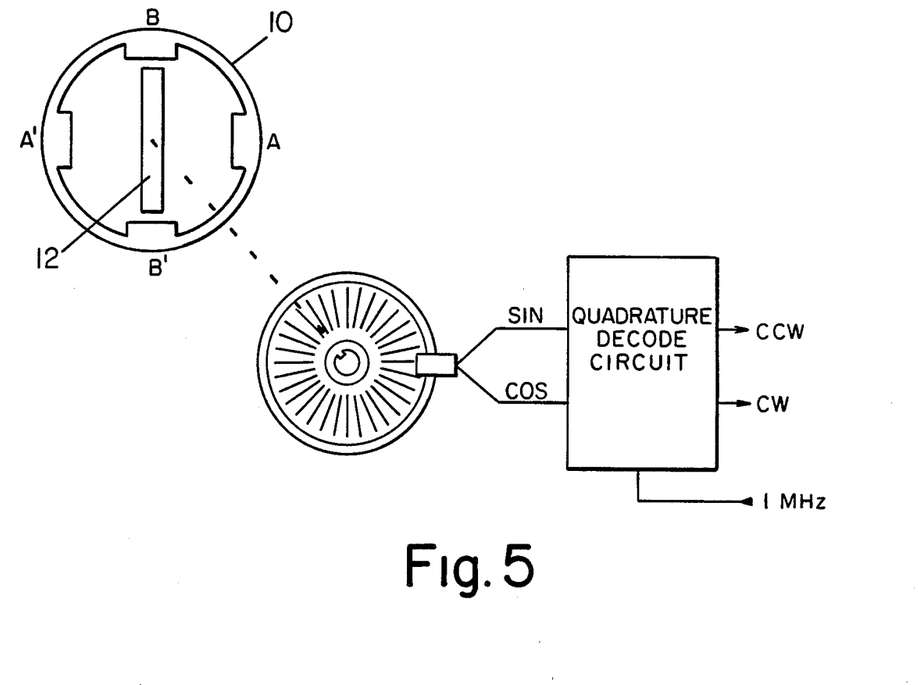
FIG. 5 is a function level diagram illustrating the interrelation of the components of a motor and motor control system according to this invention.

A simplified diagram of a stepping motor with an incremental encoder interface is shown in FIG. 5. A "square" wave type encoder is assumed. That is, the sine and cosine signals of the encoder are square waves displaced 90 degrees with respect to each other.

The sine and cosine signals are synchronized with a 1 MHz system clock to produce "UP" (up) or "DN" (down) pulses relative to the sequence in which the incoming sine and cosine signals change level states.

The translation technique described above can be implemented in a single Programmable Array Logic device (PAL). The Boolean equation for translation of the encoder input signals to up/down output pulses is shown below. A "times four" (×4) translation is assumed. That is, four output pulses (either up or down, depending on encoder direction) will be generated for each full Sin/Cos cycle. The specific example shown below is for PAL type "16R4". This PAL is labeled M1 in FIG. 6.

Figure 6:
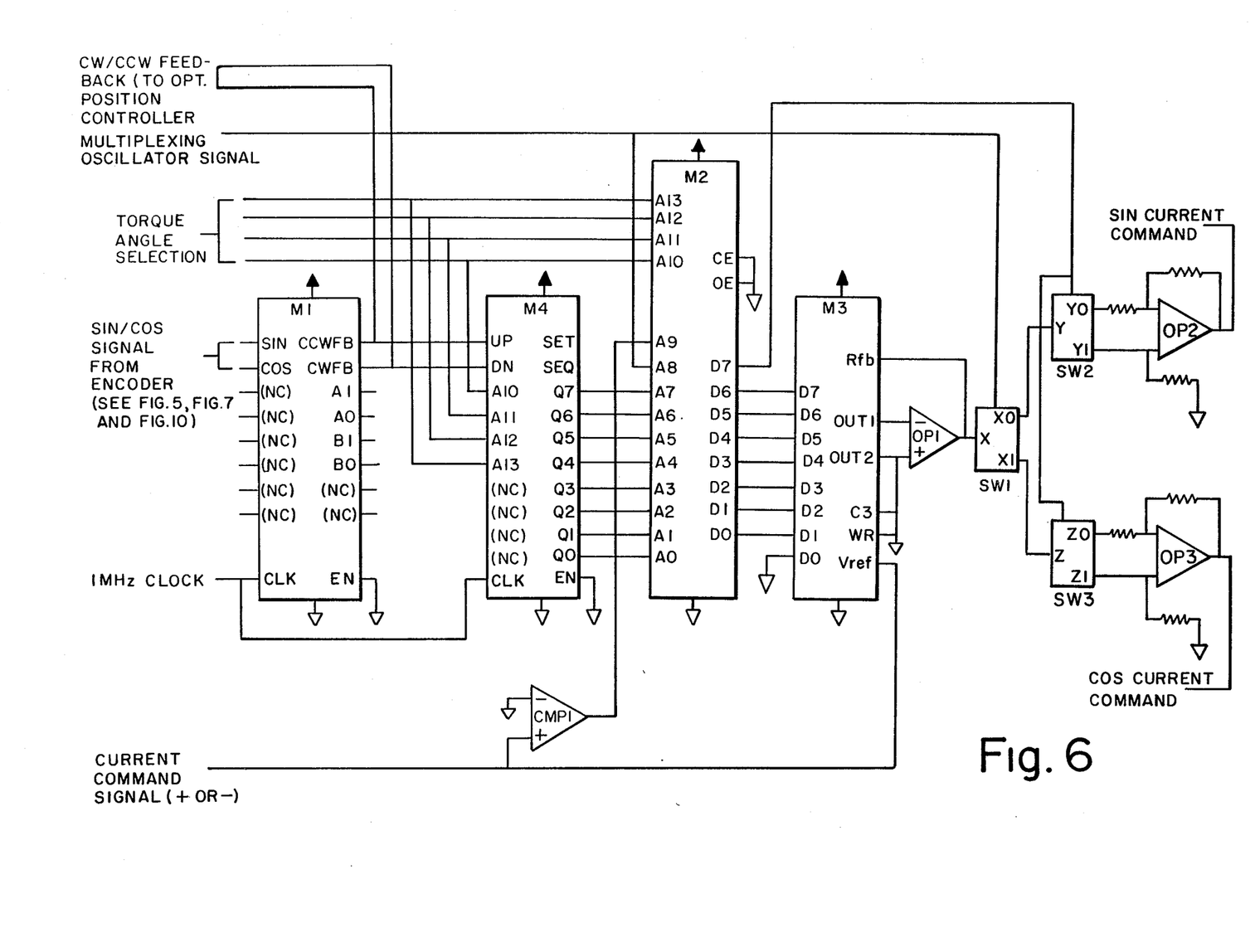
FIG. 6 is a circuit diagram of a torque angle controller according to this invention.

| BOOLEAN EQUATION FOR PAL M1 OPERATING IN "X4" MODE | |
|---|---|
| | EQUATION NOMENCLATURE |
| /CCWFB = B0*B1*/A0*A1 + /B0*/B1*A0*/A1 + A0*A1*B0*/B1 + /A0*/A1*/B0*B1 /CWFB = B0*B1*A0*/A1 + /B0*/B1*/A0*A1 + A0*A1*/B0*B1 + /A0*/A1*B0*/B1 | * - "AND" Function + - "OR" Function / - Inverse of input or output definition. |
| /B1: = /SIN /B0: = /B1 /A1: = /COS /A0: = /A1 | : - Output "True" on next clock change (1 MHz Clock.) |

The actual circuit needed for controlling the torque angle is illustrated in FIG. 6. The circuit of FIG. 6 is composed of the following components.

A programmable logic array M1, type 16R4, is used to convert the SIN and COS encoder signals to CW and CCW feedback pulses already described. A programmable logic array M4, type 20×8, is used as an "up/down" counter to convert the CW and CCW feedback pulses into a digital value representing the absolute position of the rotor. Included with these possible angles are the "Initialization" torque angle illustrated in FIG. 4.

A programmable read only memory M2 (type 27128) is used to encode the digital position produced by M1 into information for emulating digital SIN or COS current command signals. The information presented at the output of the PROM is "multiplexed". These multiplexed current commands are ultimately used by a power amplifier as control signals for regulating current in the stator windings of the stepping motor. A four quadrant, multiplying digital to analog converter M3 transposes the multiplexed digital SIN and COS information provided by M2 into multiplexed analog SIN and COS signals. Components Op1, Op2, Op3, SW1, SW2, SW3 are used to "de-multiplex" the SIN and COS information presented by M3 into separate SIN and COS current command signals. Comparator CMP1 is used to detect the polarity of the CURRENT COMMAND signal. Decoding current command polarity is needed in order to determine which torque angle vector to apply to the motor stator. (i.e., the CCW or CW torque angle.)

The circuit illustrated in FIG. 6 can implement torque angle control using virtually any encoder resolution. Since the position emulating circuits M1 and M2 are programmable, encoders ranging from a few hundred "lines" per revolution up to many thousands of "lines" per revolution can be used. The maximum resolution of the encoder is limited only by the counting range of M1 and the data storage range of M2.

The circuit configuration of FIG. 6 has a practical encoder resolution range of between 200 and 2000 lines per resolution. With M1 configured for operation in ×4 mode, this translates into an effective resolution of between 800 and 8000 lines (or steps) per revolution.

Figure 8:
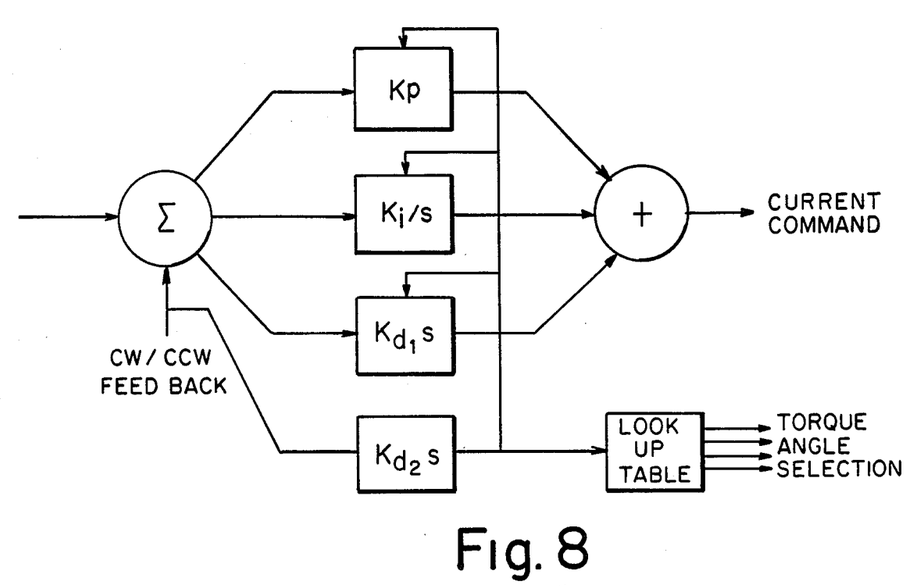
FIG. 8 is a block diagram illustrating a feedback control system that could be implemented using the position control circuit of FIG. 7.

The nature of the circuit of FIG. 8 dictates that the selected resolution be evenly divisible by the pole count of the motor. In other words, for this circuit to be used with a standard 1.8 degree stepping motor, the encoder resolution must be evenly divisible by 50.

Absolute position emulation is accomplished with PAL device M4. An example equation for M4 is shown below for an effective encoder resolution of 1000 lines per revolution encoded in the ×4 (times 4) mode discussed above. As was previously mentioned, a 50 pole stepping motor is assumed.

BOOLEAN EQUATION FOR PAL M4 OPERATING IN 4000 STEP/REV. MODE

| BOOLEAN EQUATION FOR PAL M4 OPERTING IN 4000 STEP/REV. MODE | |
|---|---|
| /Q7: = | NEEDED FOR 4000 STEP RESOLUTION) |
| /Q6: = | /Q6*UP*SET |
|  | + /Q6*/UP*A*SET |
|  | :+:/Q5*/Q4*/Q3*/Q2*/Q1*/ |
|  | Q0*/UP*A*SET |
|  | + Q5*Q4*Q3*Q2*Q1*Q0*/ |
|  | DN*SET |
| /Q5: = | /Q5*UP*SET |
|  | + /Q5*/UP*A*SET |
|  | :+:/Q4*/Q3*/Q2*/Q1*/Q0*/ |
|  | UP*A*SET |
|  | + |
|  | Q4*Q3*Q2*Q1*Q0*/DN*A*-SET |
| /Q4: = | /Q4*UP*SET |
|  | + /Q4*/UP*A*SET |
|  | :+:/Q3*/Q2*/Q1*/Q0*/ |
|  | UP*A*SET |
|  | + Q3*Q2*Q1*Q0*/DN*A*SET |
| /Q3: = | /Q3*UP*SET |
|  | + /Q3*/UP*A*SET |
|  | :+:/Q2*/Q1*/Q0*/UP*A*SET |
|  | + Q2*Q1*Q0/DN*SET |
| /Q2: = | /Q2*UP*SET |
|  | + /Q2*/UP*A*SET |
|  | :+:/Q1*/Q0*/UP*A*SET |
|  | + Q1*Q0*/DN*SET |
| /Q1: = | /Q1*UP*SET |
|  | + /Q1*/UP*A*SET |
|  | :+:/Q0*/UP*A*SET |
|  | + Q0*/DN*SET |
| /Q0: = | /Q0*UP*SET |
|  | + /Q*/UP*A*SET |
|  | :+:/UP*A*SET |
|  | + /DN*SET |
| /A = | /Q6*Q5*Q4*/Q3*/Q2*/Q1*/ |
|  | Q0*/UP |
|  | + Q6*Q5*Q4*Q3*Q2*Q1*Q0* |
|  | DN |
| /SET = | /A13*/A12*/A11*/A10 |

EQUATION NOMENCLATURE

:+: - EXCLUSIVE "OR" FUNCTION.

The programmable read only component (PROM) M2 of FIG. 6 can be of any storage size that translate a given address into a one byte (8 bit) output segment. Eight bits of (signed) current command resolution (either for SIN or COS) is more than adequate when emulating a current command at a maximum of 160 steps per electrical cycle (which is 8000 steps per revolution with a 50 pole stepping motor).

The TORQUE ANGLE SELECTION inputs of PROM M2 are provided for selecting one of sixteen possible operating torque angles. The mapping equations for programming PROM M2 are shown below. The equations below are formulated for operation at 4000 steps per revolution as was the case with PAL M4 equation above.

MAPPING EQUATIONS OF PROM M2 FOR TORQUE ANGLE SELECTION

For The Range Of L=176 To 255 (multiplexing signal, A8=0);
SIN COMMAND=127-*SIN[(255−L)/79*(2π+N:M)]

For The Range Of L=432 To 511 (multiplexing signal, A8=1);
COS COMMAND=127-*COS[(511−L)/79*(2π+N:M)]

The SIN COMMAND and COS COMMAND terms of the equation shown above represent the magnitude (in decimal form) of the multiplexed digital output byte D0 through D7 of PROM M2 (D7 represents the "sign" bit).

Variable "L" denotes the output counting stage Q0 through Q7 of PAL counter M4 in decimal format (PAL equations for M1 described earlier). Note that Q0 through Q7 of M4 are inverted outputs. Thus, variable "L" denoted in the equations above is represented in one's complement format (i.e., 0=255 and 255=0).

Variable "N:M" denotes the torque angle selector. This variable is made up of concatenated terms "N" and "M". Term "N" (address bit A9) represents the current command signal polarity. Term "M" (address bits A10, A11, A12 and A13) of M2 represents the absolute torque angle (angles Θ−α or −(Θ−α)). The torque angle direction is Θ−α relative to the rotor, if address bit A9 is logic high. The torque angle direction is −(Θ−α) relative to the rotor if address bit A9 is logic low.

The "Initialization" torque angle is selected by setting term "M" (address bits A10, A11, A12, A13) to all zeroes (logic low). These bits are also fed into PAL device M4 (described earlier). Referring back to the Boolean equation for PAL M4, note that with bits A10 through A13 set logic low, the set function is initialized and output signals Q0 through Q7 are preset to logic high. This is the initial counting state for M4. The output of PROM M2 for the initialization mode reduces to the following output state.

| EQUATIONS OF PROM M2 FOR INITIALIZATION TORQUE ANGLE |
|---|
| SIN COMMAND = SIN[0] |
| COS COMMAND = COS[0] |
| WHERE: M = 0 |
| N = "DON'T CARE" |
| L = "DON'T CARE" |

When bit A10 through A13 are set to any other state (except of course all zero), counting is enabled for M4 and a given operation torque angle is selected.

The SIN CURRENT COMMAND and COS CURRENT COMMAND are assigned to a linear or PWM drive amplifier. A suitable PWM drive current amplifier is disclosed in my U.S. Pat. No. 4,652,806 with reference to FIG. 5(b).

Figure 7:
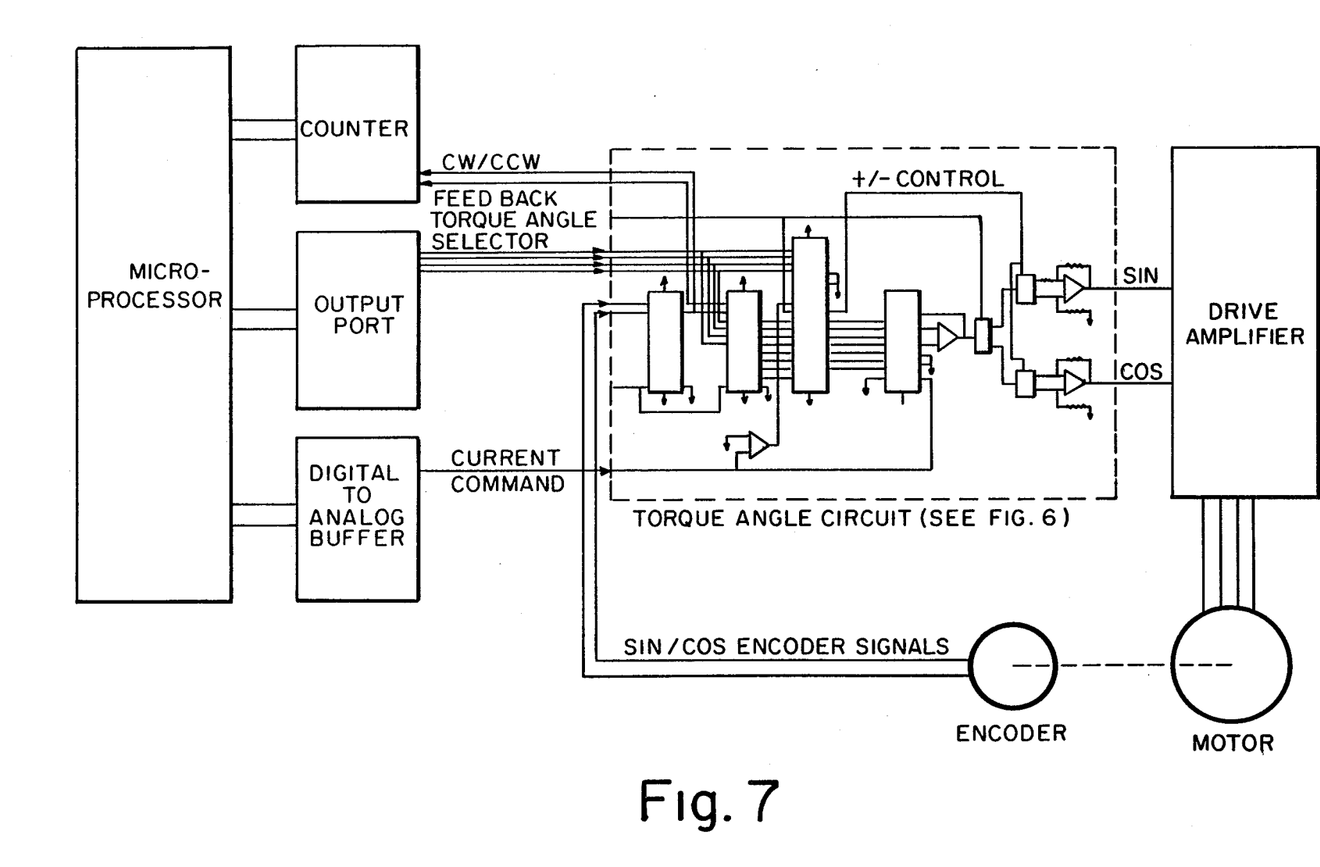
FIG. 7 is a simplified diagram of a position control circuit using the torque angle controller of FIG. 6.

A simplified diagram of a microprocessor based position loop controller is shown in FIG. 7. Inserted into this diagram is an outline of the torque angle circuit shown in FIG. 6.

The basic microprocessor position loop interface consists of a counter for monitoring the "CW and CCW feedback" pulses generated by the torque angle control circuit. An output port is provided to control the "torque angle selector" inputs of the torque angle control circuit.

A digital to analog converter (buffer) is provided to generate the analog "current command" signal.

As was described, it is the "torque angle selector" signals that control the position of the torque angle flux. The flux position can be fixed or can be altered dynamically, as described below.

It is the "current command" signal that specifically controls the magnitude of the torque angle flux if the flux vector (torque angle) is maintained in a constant position. If the torque angle position is altered "dynamically", then the magnitude of the flux is a function of both the current command signal and the torque angle selector.

A block diagram of a microprocessor loop gain function that could be used to control absolute rotor position, as well as "dynamically" control the torque angle of the motor, is shown in FIG. 8.

The loop function of FIG. 8 is a basic PID (Proportional, Integral, Derivative) position loop filter modified to control torque angle position as well as absolute rotor position. The terms Kp (proportional gain modifier), $K_i/S$ (integral gain modifier), and $K_{d1}S$ (differential or damping gain modifier) are used to determine a net "current command" (or torque signal) which is relative to the error between the "Position command" and "CW/CCW feedback".

The $K_{d2}S$ term (referring to FIG. 8) is used specifically as a gain-modifying term for selection of a given torque angle (through the "torque angle selector" outputs), specified by the "Look up table" block. The $K_{d2}S$ term provides information to the look up table relative to the rotor velocity (rotor velocity is determined by measuring the pulse count per unit time of the incoming CCW feedback signal).

The $K_{d2}S$ term must also provide information for "dynamic gain adjustment" of modifiers $K_p$, $K_i$, and $K_{d2}$. Dynamic torque angle control can be visualized by referring to FIG. 9. Torque versus speed profiles for three "fixed" torque angles are shown. These curves are "normalized" to show the general torque/speed characteristics of a 50 pole stepping motor.

Figure 9:
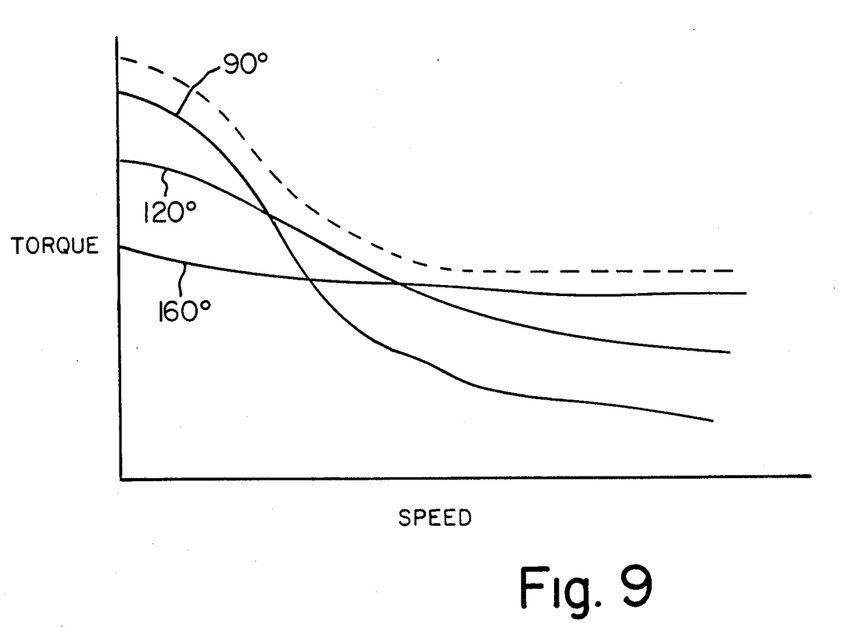
FIG. 9 is a graph illustrating various speed versus torque relations for various torque angles and a speed versus torque relation for a dynamic torque angle control scheme implemented with the torque angle controller of FIG. 6.

The torque/speed profile for the fixed 90 degree torque angle setting is very similar to the 50 pole stepping motor running in the normal "open loop" mode. This is because the rotor of the stepping motor running open loop assumes, by nature, the 90 degree angle just before "drop out" occurs.

Note that as the "fixed" torque angle is increased above 90 degrees, the torque/speed profile begins to "flatten". This characteristic is in agreement with the discussion earlier on torque angles set greater than 90 degrees. If the torque angle/position control function of FIG. 8 was implemented, one could expect a "dynamic torque angle control" profile similar to that shown with a dashed line in FIG. 9.

Dynamic torque angle control is cumbersome to implement, due to the fact that the general PID gain modifiers ($K_p$, $K_i$, $K_{d2}$ of FIG. 8) must usually be changed "on the fly" (i.e., they must usually be altered instantaneously, relative to the rotor velocity). Fixed torque angle position control is much simpler because the Ki, Kp, and Kd1 modifiers remain fixed.

Figure 10:
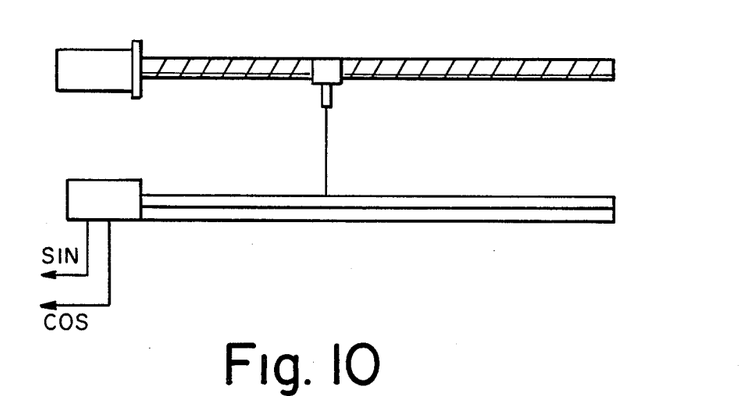
FIG. 10 is a schematic of a portion of a motor control system according to this invention implemented with a linear encoder.

For torque angle control using an incremental optical encoder is not necessarily limited to "rotary" type encoders mounted on the rotor (shaft) of the stepping motor. FIG. 10 illustrates a method for determining position using an incremental linear encoder. The SIN and COS encoder output signals from the encoder are identical to the rotary type encoder discussed earlier. To emulate angular rotor position (for purposes of torque angle control), the "pitch" of screw mechanism must be such that the angular distance between consecutive poles of the motor be relative to an integral number of linear steps of the linear encoder. This "integral number" must abide by the same constraints as that discussed for the rotary type encoder. That is, the number of steps produced by the linear encoder for one full mechanical revolution of the rotor must be evenly divisible by the pole count of the motor.

Having thus described my invention with the details and particularity required by the Patent Laws, what is claimed and desired protected by Letters Patent is set forth in the following claims.

I claim:

1. In a closed loop motor system having a motor with a plurality of poles and motor windings associated therewith, said poles defining full step motor output positions, said system of the type that assigns intermediated current values to the motor windings for fine step positions of the motor output between motor poles, the improvement comprising a motor output position encoder for generating an integral and fixed number of encoder pulses as the motor moves between any two motor poles, said pulses being equally spaced and at least some corresponding to the fine step positions, means for assigning intermediate current values comprising a counter for counting the encoder pulses, function means for converting the count to digital sine and cosine values, digital-to-analog means for converting the digital sine and cosine values to analog sine and cosine values, means for controlling electrical current to the motor windings associated with the poles in response to the analog sine and cosine values, means for setting the torque angle comprising means for adding or subtracting a torque angle value from the count applied to the function means, and initializing means comprising means for applying full step current values to motor windings for a time interval in which the motor output is assumed to align with a full step position, and means for zeroing the count in the counter and assigning the torque angle value, whereby the encoder does not require mechanical alignment relative to the motor.

2. The motor control system according to claim 1 wherein the output position encoder is a rotary encoder attached to a rotating output shaft of the motor.

3. The motor control system according to claim 1 wherein the output position encoder is a linear encoder attached to the follower riding a screw mechanism attached to a rotating output shaft of the motor.

4. The motor control system according to claim 1 wherein the output position encoder is a linear encoder attached to a linear motor.

5. The motor control system according to claim 1 wherein the counter and means for setting the torque angle comprises a presettable up/down counter having a parallel output bus and a parallel input bus for presetting the count.

6. The motor control system according to claim 5 wherein the function means and initializing means comprises a ROM having address inputs attached to the parallel output of the presettable up/down counter and address means connected to the parallel input bus of the up/down counter such that when the counter is being set to zero the ROM output corresponds to that required to bring the motor output to a full step position.

7. The motor control system according to claim 1 wherein the means for assigning intermediate motor current positions comprises a source of a multiplexing pulse applied to the function, means and switches at the output of the digital-to-analog means to provide multiplexed sine and cosine values.

8. The motor controller according to claim 1 wherein the digital-to-analog means comprises a multiplying digital-to-analog converter and the multiplying input is an analog signal level corresponding to the current level command.

9. The motor control system according to claim 1 further comprising a microprocessor having an input port for receiving the output of a counter clocked by the encoder pulses, an output port for a parallel bus upon which the value of the torque angle can be placed, and an output port connected to a buffer attached to an analog-to-digital converter for defining an analog current command.

* * * * *